United States Patent
Mannen et al.

(10) Patent No.: US 8,140,749 B2
(45) Date of Patent: Mar. 20, 2012

(54) STORAGE CONTROL APPARATUS WITH MEMORY BACKUP DEVICE

(75) Inventors: Akihiro Mannen, Kawasaki (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 429 days.

(21) Appl. No.: 12/379,638

(22) Filed: Feb. 26, 2009

(65) Prior Publication Data

US 2010/0131704 A1    May 27, 2010

(30) Foreign Application Priority Data

Nov. 27, 2008 (JP) ................................. 2008-302983

(51) Int. Cl.
*G06F 12/00* (2006.01)
(52) U.S. Cl. ........ 711/113; 711/100; 711/111; 711/112; 711/154
(58) Field of Classification Search .................. 711/100, 711/111–113, 154
See application file for complete search history.

(56) References Cited

U.S. PATENT DOCUMENTS 5,905,994 A * 5/1999 Hori et al. ..................... 711/113
2004/0122987 A1* 6/2004 Henry et al. ...................... 710/5

FOREIGN PATENT DOCUMENTS

| JP | 59-135568 | 8/1984 |
| JP | 2000-347815 | 12/2000 |

* cited by examiner

*Primary Examiner* — Jasmine Song
(74) *Attorney, Agent, or Firm* — Antonelli, Terry, Stout & Kraus, LLP.

(57) ABSTRACT

In a storage control apparatus provided therein with a battery-backed-up memory device being a combination of a cache memory of a storage device and a system memory on the side of a CPU, an ASIC (Application-Specific Integrated Circuit) having a virtual window function is provided to a system. I/O from a front end and/or a back end is performed via a virtual window, thereby making an addition of data integrity code, and performing automatic dual write of data. With such a storage control apparatus provided therein with a battery-backed-up memory being a combination of a CS/DS (Code Storage/Data Storage) and a cache, protection of block data, and dual write into a Cache (user data, control data) are implemented so that the reliability can be kept at the time of data input/output control.

10 Claims, 19 Drawing Sheets

DUAL WRITING OF DATA OF FIRST PREVIOUS EXAMPLE

US 8,140,749 B2

STORAGE CONTROL APPARATUS WITH MEMORY BACKUP DEVICE

CROSS REFERENCES TO RELATED APPLICATIONS

This application relates to and claims priority from Japanese Patent Application No. 2008-302983, filed on Nov. 27, 2008, the entire disclosure of which is incorporated herein by reference.

BACKGROUND OF THE INVENTION

1. Field of the Invention

The present invention relates to a storage control apparatus provided therein with a memory device being a combination of a cache memory of a storage device with a system memory on the side of a Central Processing Unit to remain reliable at the time of data input/output control.

2. Description of the Related Art

There is a technology of making use of a plurality of memories, e.g., disk memories and cache memories, for control over data input/output to/from a storage device provided therein with a plurality of disk drives. As such a technology, Patent Document 1 (JP-A-59-135563) describes, for example, a computer system in which a disk/cache device to be connected to a disk control device is configured by a portion of nonvolatile memory and a portion of volatile memory. With such a computer system, an output process from a Central Processing Unit (CPU) is completed when data writing to the nonvolatile portion in the disk/cache device is finished, and a plurality of data pieces on the nonvolatile portion in the disk/cache device are collectively written into the disk drives.

Patent Document 2 (JP-A-2000-347815) describes, for example, a disk array system in which, for increasing the reliability of the disk array system, a integrity code is added to data on a logical data block basis for writing into a disk drive, thereby detecting any reading/writing with respect to any abnormal address of split data or detecting any data bit error during data transfer. The integrity code is of any Logical Address or of exclusive OR LRC (Longitudinal Redundancy Check).

FIGS. 19 to 21 show, respectively, configuration diagrams of first and second previous examples, i.e., storage control apparatus provided therein with a memory device being a combination of a cache memory and a system memory on the CPU side, and exemplary dual write of data in the first previous example.

In the storage control apparatus of the first previous example of FIG. 19, dual write of data is performed using a dual path through a connection of a Peripheral Component Interconnect Express (PCIe) 209 to a memory control hub (MCH) 203. The memory control hub 203 is being connected with a battery-backed-up memory (Memory) 201, a Central Processing Unit (CPU) 202, a front-end chip (FE) 204, and a back-end chip (BE) 206. The battery-backed-up memory 201 is a combination of a CS/DS (Code Storage/Data Storage) memory being a system memory on the side of the CPU, and a cache (Cache) memory of a storage device.

In the storage control apparatus of the second previous example of FIG. 20, dual write of data is performed using a dual path (Dual Path) by an application-specific integrated circuit (ASIC) 207 connected to the memory control hub (MCH) 203, and various other components, i.e., the front-end chip (FE) 204, the back-end chip (BE) 206, and the battery-backed-up cache memory (Cache Memory) 201. The memory control hub 203 is being connected to a cache (Cache) memory 210 of a storage device and the Central Processing Unit (CPU) 202, and the cache memory 201 is being a combination of a CS/DS (Code Storage/Data Storage) being a system memory on the side of the CPU, and a cache (Cache) memory.

As shown in FIG. 21, with dual write of data in the first previous example, firstly, data is written into the battery-backed-up memory 201 being a combination of a CS/DS and a cache from the front-end chip (FE) 204 via the memory control hub (MCH) 203. Secondly, the data written into the memory 201 is read into the Central Processing Unit (CPU) 202 via the memory control hub (MCH) 203, and a copy process is executed for dual writing of data in the Central Processing Unit (CPU) 202. Thirdly, dual write of data is performed to any other system using a dual path (Dual Path) of the Peripheral Component Interconnect Express (PCIe) 209 from the Central Processing Unit (CPU) 202 via the memory control hub (MCH) 203.

SUMMARY OF THE INVENTION

With the storage control apparatus of the first previous example, there is a problem of protection difficulty in protecting block data, i.e., data integrity check, and dual write of user data causes a load increase on the CPU and a memory bus. This is also true for control data, i.e., causes a load increase on the CPU and the memory bus for dual writing.

The storage control apparatus of the second previous example is of the configuration in which the ASIC is coupled with the FE 205 and the BE 206, and the battery-backed-up memory 201 being a combination of a CS/DS and a cache, and there thus is a problem of high cost of the ASIC.

In consideration thereof, an object of the invention is to achieve, in a storage control apparatus provided therein with a battery-backed-up memory being a combination of a CS/DS and a cache, protection of block data, i.e., addition, inspection, and deletion of data integrity code, and dual write into a cache, i.e., user data and control data, and to keep the reliability at the time of data input/output control.

An aspect of the invention is directed to a storage control apparatus provided therein with a battery-backed-up memory device being a combination of a cache memory of a storage device with a system memory on the side of a CPU. In the storage control apparatus, an ASIC (Application-Specific Integrated Circuit) having a function of a virtual window is provided to a system, and input/output (I/O) from a front end and/or a back end via the virtual window, thereby adding a data integrity code, and performing automatic dual write of data.

Another aspect of the invention is directed to a storage control apparatus provided with a function of a virtual window enabling memory access from outside to the ASIC, i.e., function of, when any access is made to the virtual window, performing data integrity code addition, inspection, and deletion, and performing dual write into a cache.

For protection of block data, i.e., data integrity check process, the ASIC performs data integrity code addition, inspection, and deletion in accordance with a transfer list that is designated in advance with a transfer destination of an FE/BE chip being an address on the virtual window.

For dual writing of user data and control data, with the address of a transfer destination being an address on the virtual window for dual writing, and the ASCI writes, by copying, any written data into a cache of its own and another of any other system.

According to the aspects of the invention, in the storage control apparatus provided therein with a battery-backed-up memory being a combination of a CS/DS and a cache, while using a CPU-side memory as a cache, a data integrity code process can be executed, and the function such as dual write into a cache can be performed in response to any I/O or memory access made from the CPU to the virtual window, thereby being able to keep the reliability at the time of data input/output control.

Also in the aspects of the invention, with the virtual window provided as such, i.e., memory space, the ASIC having no memory I/F can operate as if having a memory so that no cost increase is expected unlike in the case where the ASIC is provided with a memory I/F with a larger number of I/O pins. Accordingly, the cost reduction can be favorably achieved by the reduction of the number of I/O pins in the ASIC, the logic reduction, and the reduction of the memory-mounted area.

DESCRIPTION OF THE PREFERRED EMBODIMENT

Figure 1:
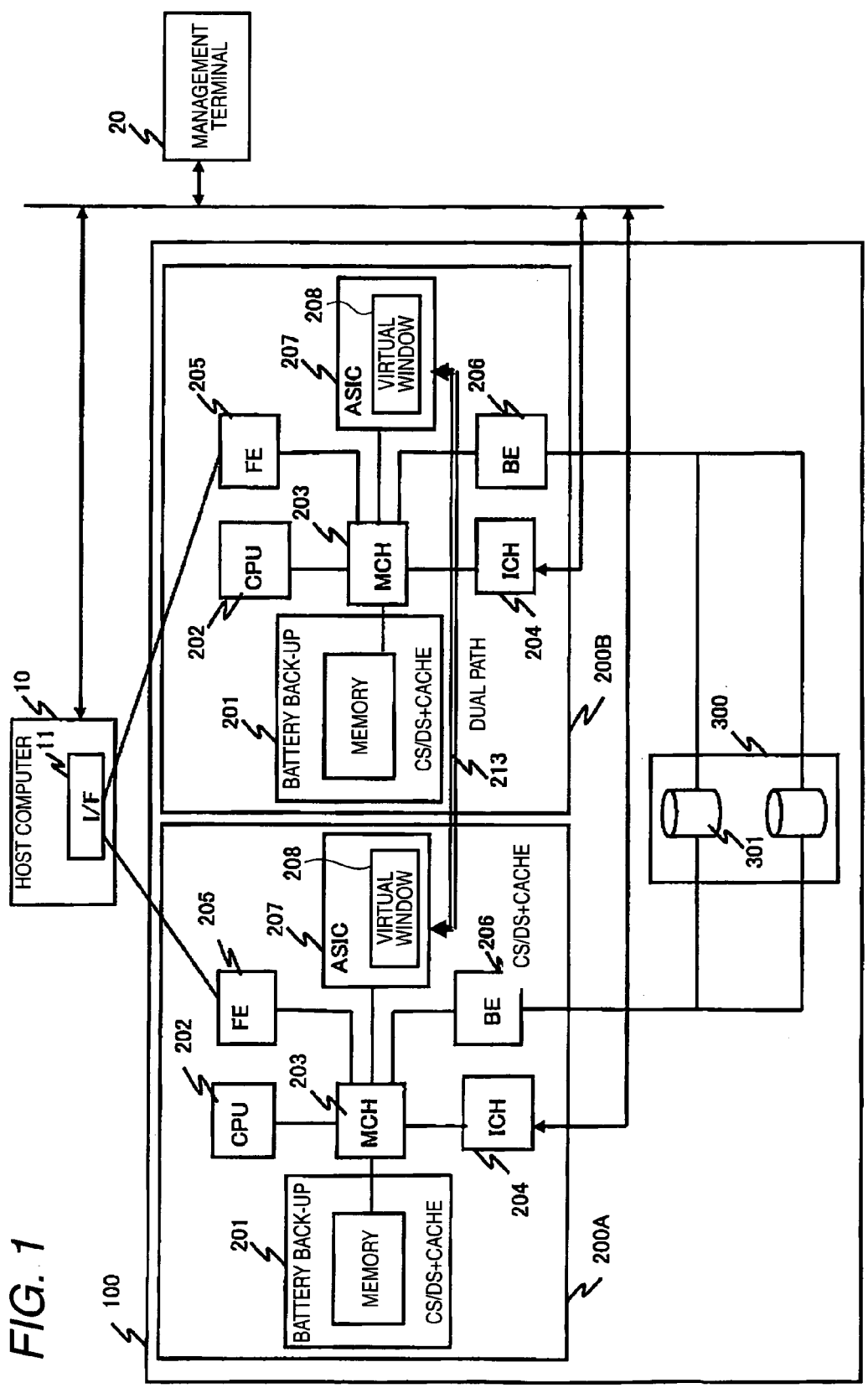
FIG. 1 is a configuration diagram of a storage system in its entirety to which a storage control apparatus of the invention is applied.

In the below, by referring to the accompanying drawings, an embodiment of the invention is described. FIG. 1 shows the entire configuration of a storage system to which a storage control apparatus of the invention is applied. In FIG. 1, a reference numeral 10 denotes a host computer, a reference numeral 11 denotes an interface (I/F), a reference numeral 20 denotes a management terminal, a reference numeral 100 denotes a memory control device, reference numerals 200A and 200B each denote a storage control apparatus, a reference numeral 201 denotes a battery-backed-up cache memory being a combination of a CS/DS and a cache, a reference numeral 202 denotes a Central Processing Unit (CPU), a reference numeral 203 denotes a memory control hub (MCH), a reference numeral 204 denotes an input/output control hub (ICH), a reference numeral 205 denotes a front-end chip (FE), a reference numeral 206 denotes a back-end chip (BE), a reference numeral 207 denotes an application-specific integrated circuit (ASIC), a reference numeral 208 denotes a virtual window, a reference numeral 209 denotes a Peripheral Component Interconnect Express (PCIe), a reference numeral 213 denotes a dual path, a reference numeral 300 denotes a storage device, and a reference numeral 301 denotes a disk drive.

In the storage control apparatuses 200A and 200B, their front-end chips (FEs) 205 are each coupled to the interface (I/F) 11 of the host computer 10, their back-end chips (BEs) 206 are each coupled to the storage device 300 provided therein with the disk drive 301, and their input/output control hubs (ICHs) 204 are each coupled to the management terminal 20. Also in the storage control apparatuses 200A and 200B, their application-specific integrated circuits (ASICs) 207 respectively provided therein with the virtual windows 208 are each coupled to the dual path (Dual Path) 213 so that duplication of data is performed between the storage control apparatuses 200A and 200B.

FIRST EXAMPLE

Figure 2:
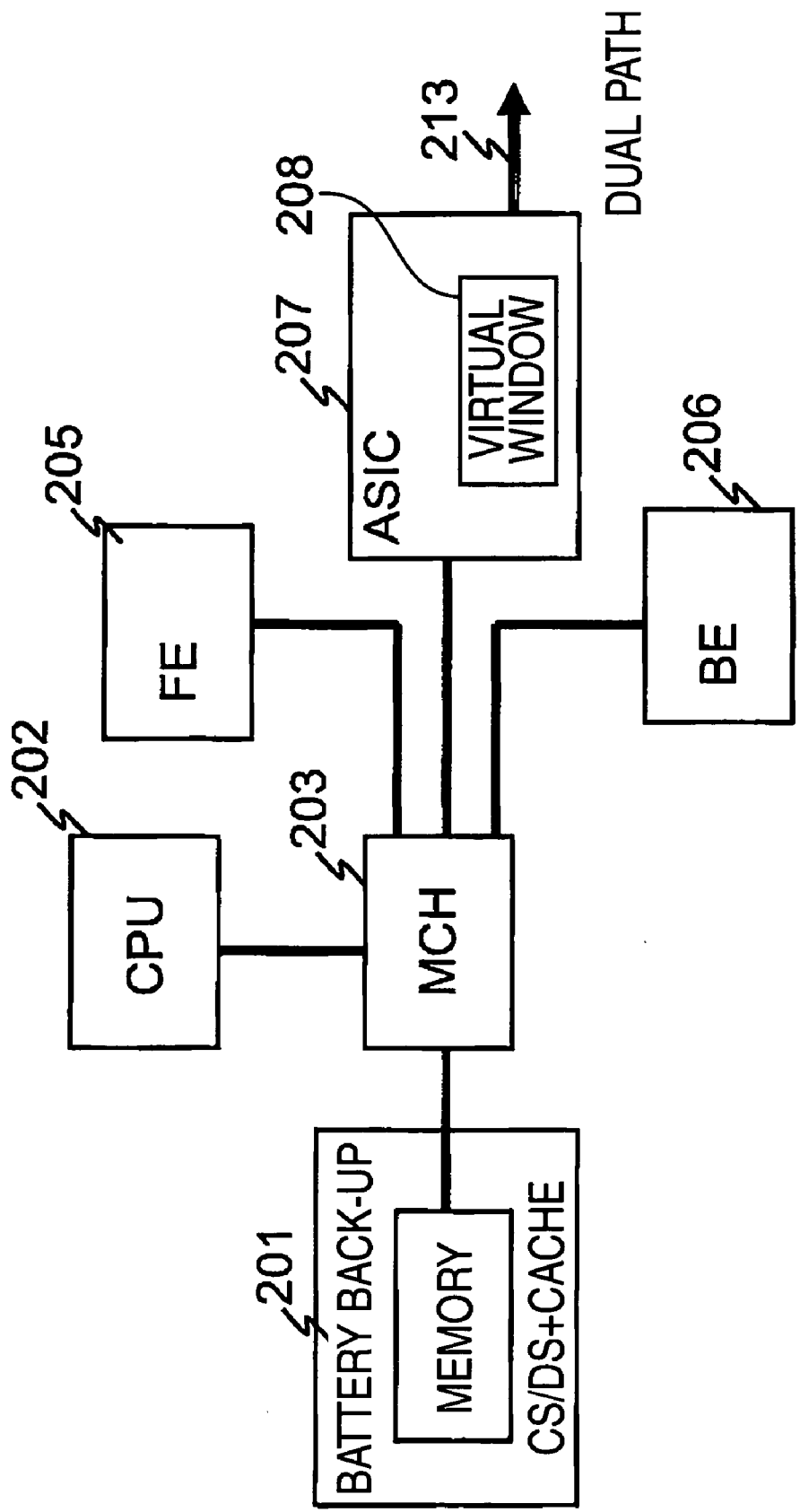
FIG. 2 is a diagram showing the configuration of a storage control apparatus in a first example of the invention.

FIG. 2 shows the configuration of a storage control apparatus of a first example of the invention. In FIG. 2, the reference numeral 201 denotes a battery-backed-up cache memory being a combination of a CS/DS and a cache, the reference numeral 202 denotes a Central Processing Unit (CPU), the reference numeral 203 denotes a memory control hub (MCH), the reference numeral 205 denotes a front-end chip (FE), the reference numeral 206 denotes a back-end chip (BE), the reference numeral 207 denotes an application-specific integrated circuit (ASIC), the reference numeral 208 denotes a virtual window, and the reference numeral 213 denotes a dual path (Dual Path).

In the first example of FIG. 2, the memory control hub (MCH) 203 is coupled with the various components, i.e., the battery-backed-up cache memory 201 being a combination of a CS/DS and a cache, the Central Processing Unit (CPU) 202, the front-end chip (FE) 205, and the back-end chip (BE) 206. The memory control hub (MCH) 203 is also coupled with the application-specific integrated circuit (ASIC) 207.

The application-specific integrated circuit (ASIC) 207 is provided with a function of the virtual window 208, and performs data integrity code addition, inspection, and deletion in response to an input/output of data with a designation of an address on the virtual window 208 by a higher-level device, e.g., host computer (not shown), via the front-end chip (FE) 205 or an input/output of data with a designation of an address on the virtual window 208 by a lower-level device, e.g., storage device (not shown), via the back-end chip (BE) 206. As such, the application-specific integrated circuit 207 performs input/output of data for dual writing into the battery-backed-up cache memory 201 being a combination of a CS/DS and a cache or into a cache memory or others of any other system over the dual path (Dual Path) 213.

SECOND EXAMPLE

Figure 3:
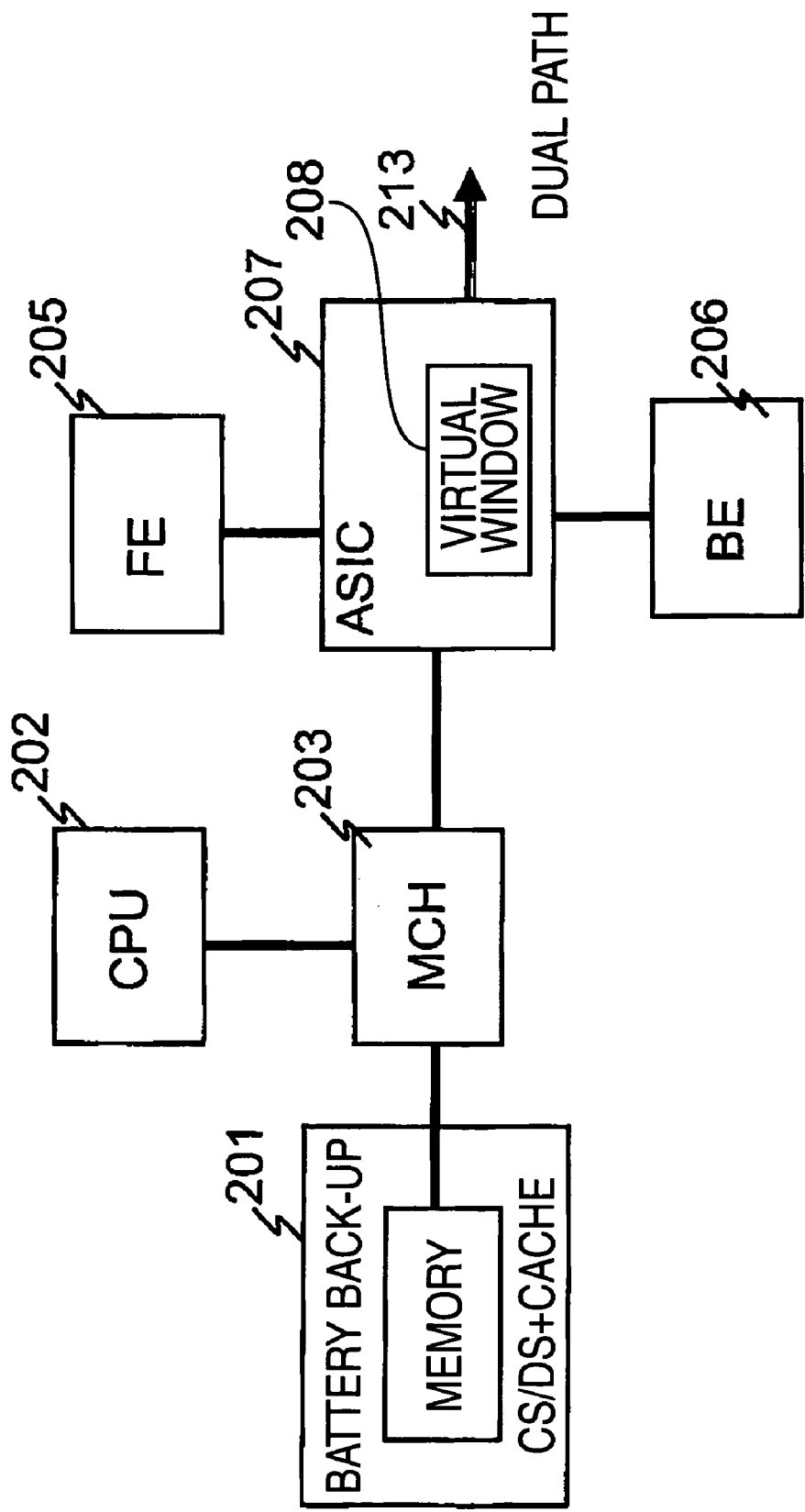
FIG. 3 is a diagram showing the configuration of a storage control apparatus in a second example of the invention.

FIG. 3 shows the configuration of a storage control apparatus of a second example of the invention. In FIG. 3, the reference numeral 201 denotes a battery-backed-up cache memory being a combination of a CS/DS and a cache, the reference numeral 202 denotes a Central Processing Unit (CPU), the reference numeral 203 denotes a memory control hub (MCH), the reference numeral 205 denotes a front-end chip (FE), the reference numeral 206 denotes a back-end chip (BE), the reference numeral 207 denotes an application-specific integrated circuit (ASIC), the reference numeral 208 denotes a virtual window, and the reference numeral 213 denotes a dual path (Dual Path).

In the second example of FIG. 3, the memory control hub (MCH) 203 is coupled with the battery-backed-up cache memory 201 being a combination of a CS/DS and a cache, and the Central Processing Unit (CPU) 202. The memory control hub (MCH) 203 is also coupled with the front-end chip (FE) 205, the back-end chip (BE) 206, and the application-specific integrated circuit (ASIC) 207.

The application-specific integrated circuit (ASIC) 207 is provided with a function of the virtual window 208, and performs data integrity code addition, inspection, and deletion in response to an input/output of data with a designation of an address on the virtual window 208 by a higher-level device, i.e., host computer (not shown), via the front-end chip (FE) 205 or an input/output of data with a designation of an address on the virtual window 208 by a lower-level device, e.g., storage device (not shown), via the back-end chip (BE) 206. As such, the application-specific integrated circuit 207 performs input/output of data for dual writing into the battery-backed-up cache memory 201 being a combination of a CS/DS and a cache or into a cache memory or others of any other system over the dual path (Dual Path) 213.

Data Integrity Code Addition Function

Figure 4:
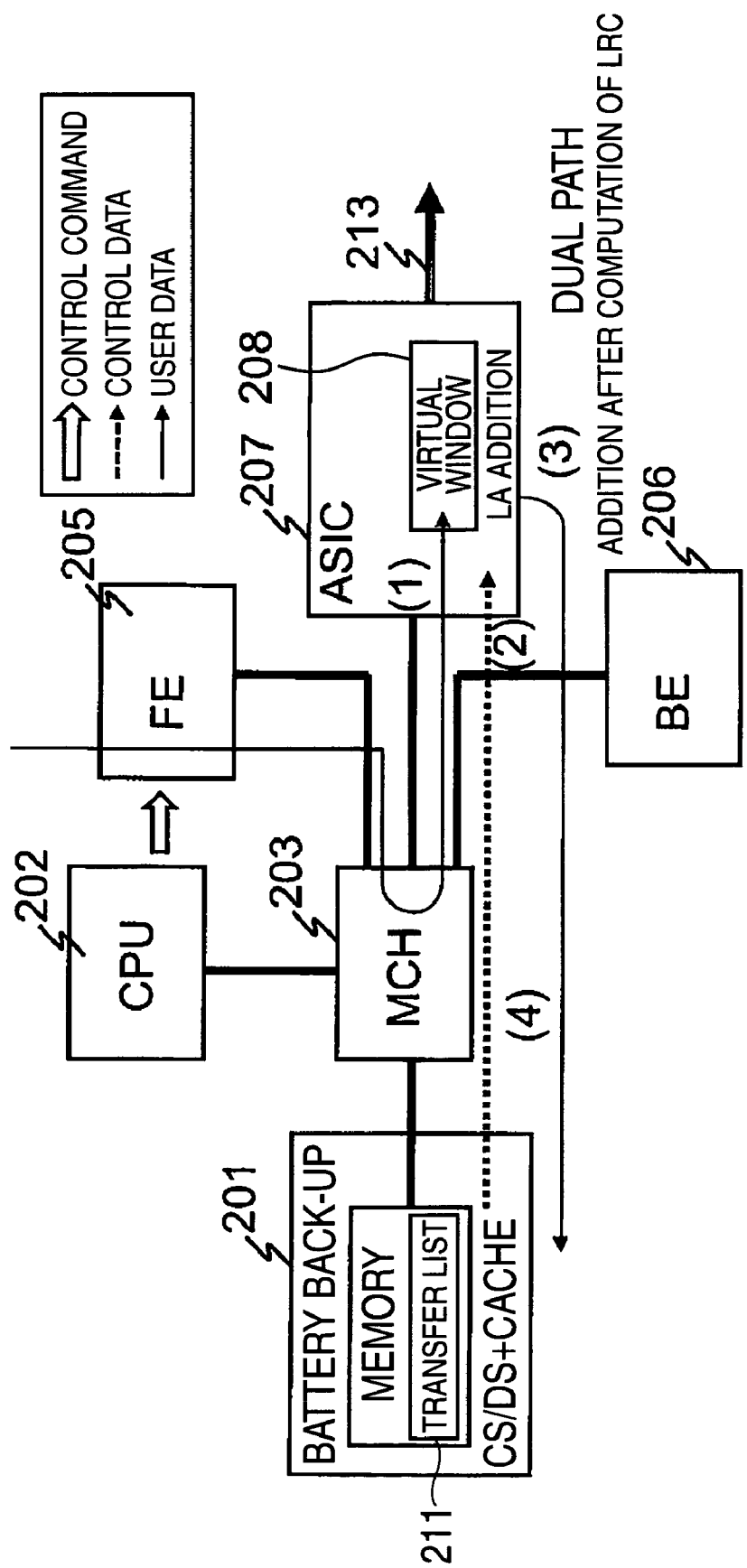
FIG. 4 is a configuration diagram showing the operation of an data integrity code addition function in the storage control apparatus of the invention.

FIG. 4 is a configuration diagram showing the operation of an data integrity code addition function in the storage control apparatus of the invention. An open arrow indicates a control command coming from the CPU, a broken arrow indicates the flow of control data, and a solid arrow indicates the flow of user data. The bracketed numbers in the drawing are corresponding to those in the flowchart and the sequence diagram.

Figure 5:
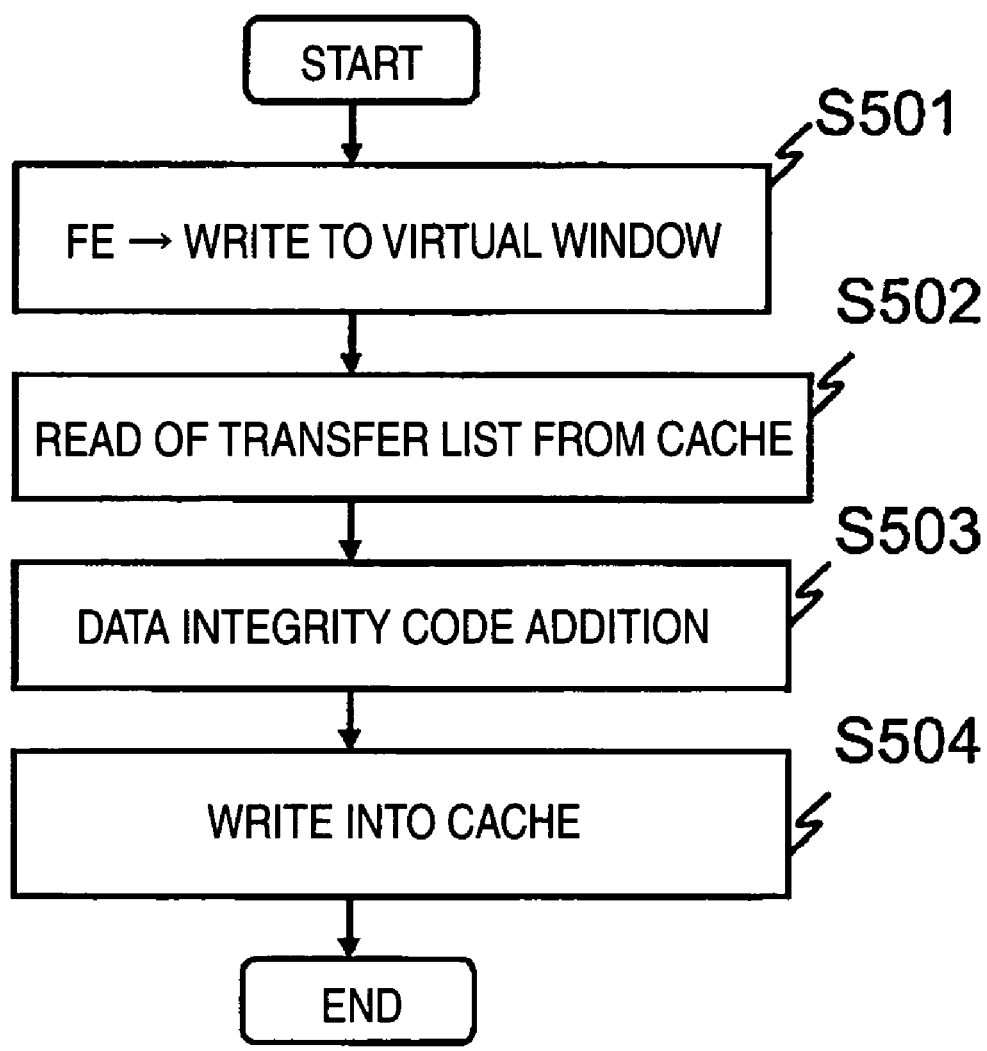
FIG. 5 is a flowchart of the operation of the data integrity code addition function in the storage control apparatus of the invention.

FIG. 5 is a flowchart of the operation of the data integrity code addition function in the storage control apparatus of the invention. When the Central Processing Unit (CPU) 202 issues a control command of transfer to the front-end chip (FE) 205, the data integrity code addition function is responsively started to operate. First of all, in step 501, the front-end chip (FE) 205 writes data from a higher-level device to the virtual window 208 of the application-specific integrated circuit (ASIC) 207. Then in step 502, a transfer list is read from the Cache 201. In step 503, the data integrity code addition process is executed, and then in step 504, the data integrity code-added data is written into the Cache 201. This is the end of the operation of the data integrity code addition function.

Figure 6:
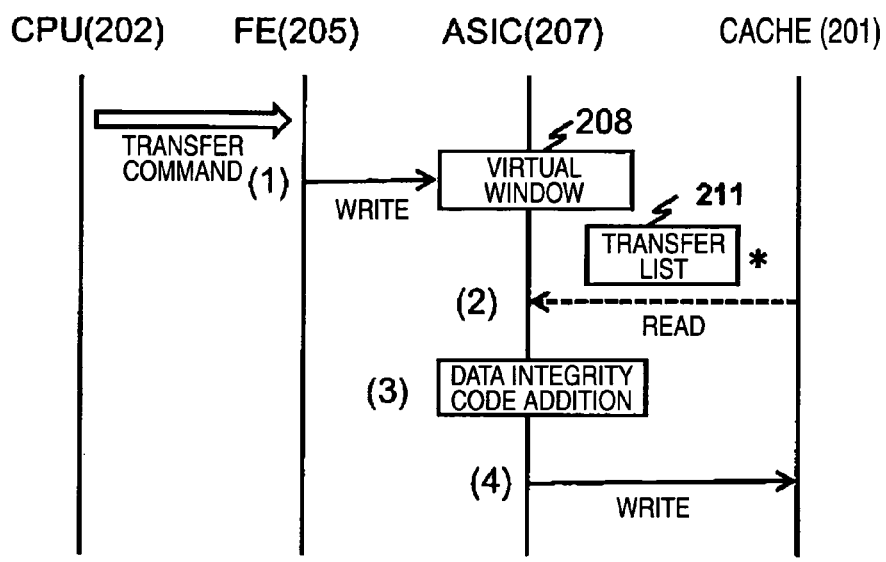
FIG. 6 is a sequence diagram of the operation of the data integrity code addition function in the storage control apparatus of the invention.

FIG. 6 is a sequence diagram of the operation of the data integrity code addition function in the storage control apparatus of the invention. In the drawing, an open arrow indicates a control command from the CPU, a broken arrow indicates the flow of control data, and a solid arrow indicates the flow of user data.

When the Central Processing Unit (CPU) 202 issues a control command of transfer to the front-end chip (FE) 205, the front-end chip (FE) 205 writes user data into the virtual window 208 of the application-specific integrated circuit (ASIC) 207 (1). The user data here is the one transferred from the host computer being the higher-level device. Te application-specific integrated circuit (ASIC) 207 then reads the transfer list being the control data from the battery-backed-up cache memory 201 being a combination of a CS/DS and a cache (2).

The application-specific integrated circuit (ASIC) 207 executes the data integrity code addition process to the user data provided from the host computer being the higher-level device (3). With reference to the transfer list, the data integrity code-added user data is then transferred to the battery-backed-up cache memory 201 being a combination of a CS/DS and a cache for a write process (4). When the data is required to be duplicated at this time, a duplication process that will be described later is executed, i.e., dual write of data is performed to the battery-backed-up cache memory 201 being a combination of a CS/DS and a cache, and to a cache memory of any other system.

Parity Generation Function

Figure 7:
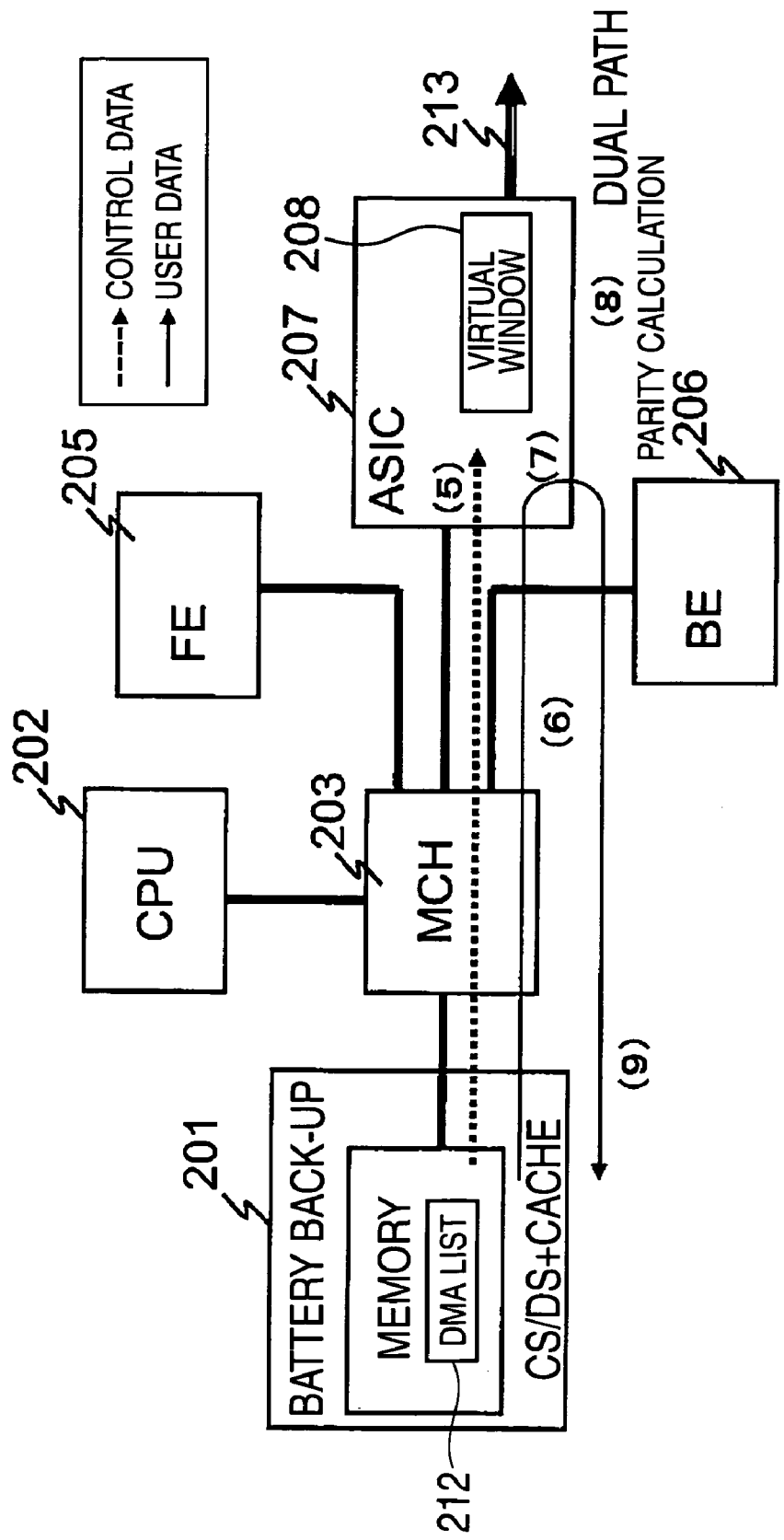
FIG. 7 is a configuration diagram showing the operation of a parity generation function in the storage control apparatus of the invention.

FIG. 7 is a configuration diagram showing the operation of a parity generation function in the storage control apparatus of the invention. In FIG. 7, a broken arrow indicates the flow of control data, and a solid arrow indicates the flow of user data. The bracketed numbers in the drawing are corresponding to those in the flowchart and the sequence diagram.

Figure 8:
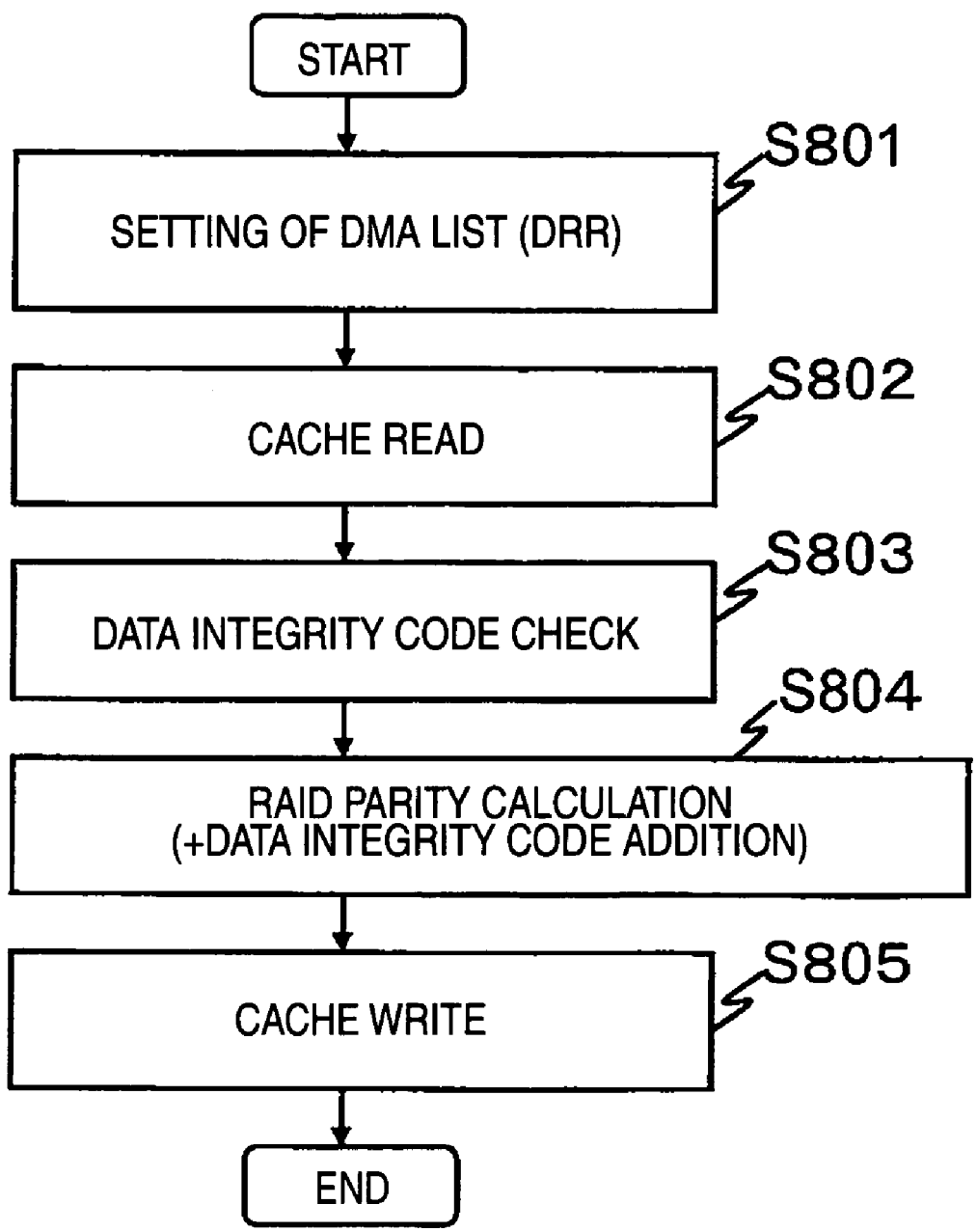
FIG. 8 is a flowchart of the operation of the parity generation function in the storage control apparatus of the invention.

FIG. 8 is a flowchart of the operation of the parity generation function in the storage control apparatus of the invention. In FIG. 8, when the parity generation function is started to operate, in step 801, the setting of a DMA (Direct Memory Access) list is started. For the setting of a DMA (Direct Memory Access) list, for example, used is the high-speed data transfer technology of the double data rate of the control data.

Then in step 802, Cache reading is performed, and then in step 803, data integrity check is performed. In step 804, a Parity calculation process of RAID (Redundant Arrays of Inexpensive (Independent) Disks) is executed, and if needed, data integrity code addition is performed. In step 804, data being a result of the parity calculation process is written into the Cache 201, and this is the end of the operation of the parity generation function.

Figure 9:
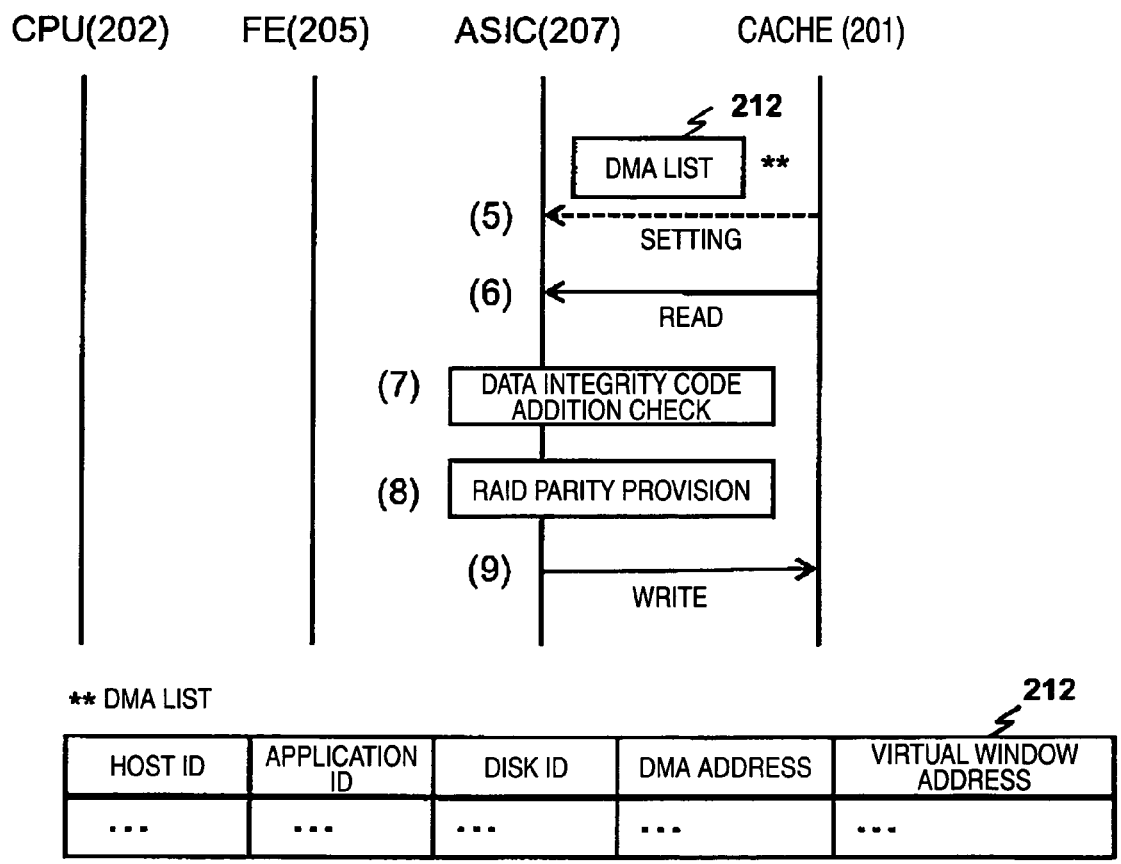
FIG. 9 is a sequence diagram showing the operation of the parity generation function in the storage control apparatus of the invention.

FIG. 9 is a sequence diagram showing the operation of the parity generation function in the storage control apparatus of the invention. In FIG. 9, a broken arrow indicates the flow of control data, and a solid arrow indicates the flow of user data. The setting of DMA list is performed by the application-specific integrated circuit (ASIC) 207 reading the DMA list being the control data stored in the battery-backed-up cache memory 201 being a combination of a CS/DS and a cache (5). Thereafter, the user data stored in the battery-backed-up cache memory 201 being a combination of a CS/DS and a cache is read also to the application-specific integrated circuit (ASIC) 207 (6).

The application-specific integrated circuit (ASIC) 207 applies data integrity code check to the data being the reading result (7), and the parity calculation process of RAID is then executed, and if needed, data integrity code addition is performed (8). The data being the result of the parity calculation process is then written into the battery-backed-up cache memory 201 being a combination of a CS/DS and a cache (9).

Data Transfer Function from Cache to BE

Figure 10:
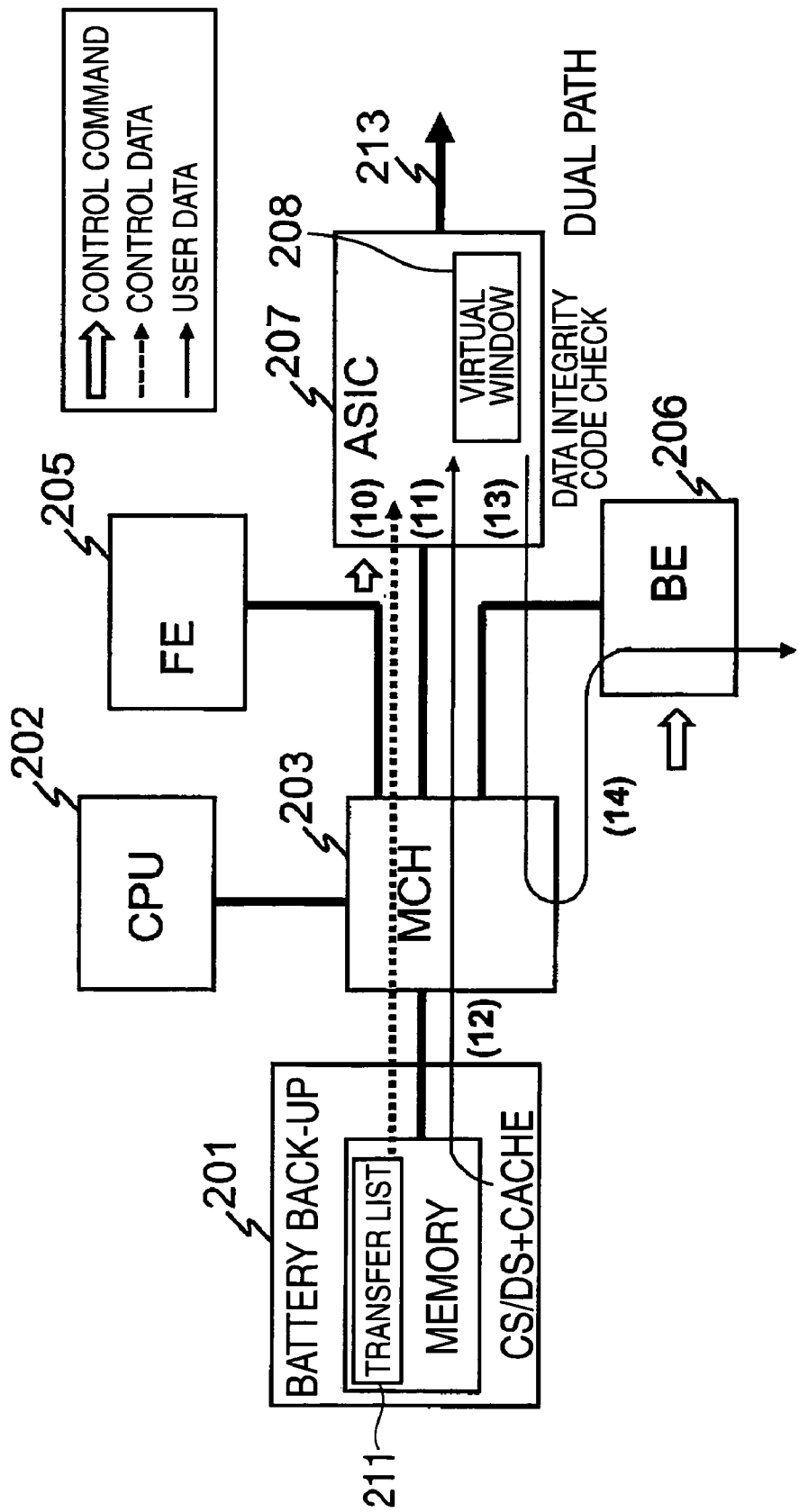
FIG. 10 is a configuration diagram showing the operation of a data transfer function from a cache to a BE of the storage control apparatus of the invention.

FIG. 10 is a configuration diagram showing the operation of a data transfer function from the cache to the BE in the storage control apparatus of the invention. In FIG. 10, an open arrow indicates a control command coming from the CPU or from the BE, a broken arrow indicates the flow of control data, and a solid arrow indicates the flow of user data. The bracketed numbers in the drawing are corresponding to those in the flowchart and the sequence diagram.

Figure 11:
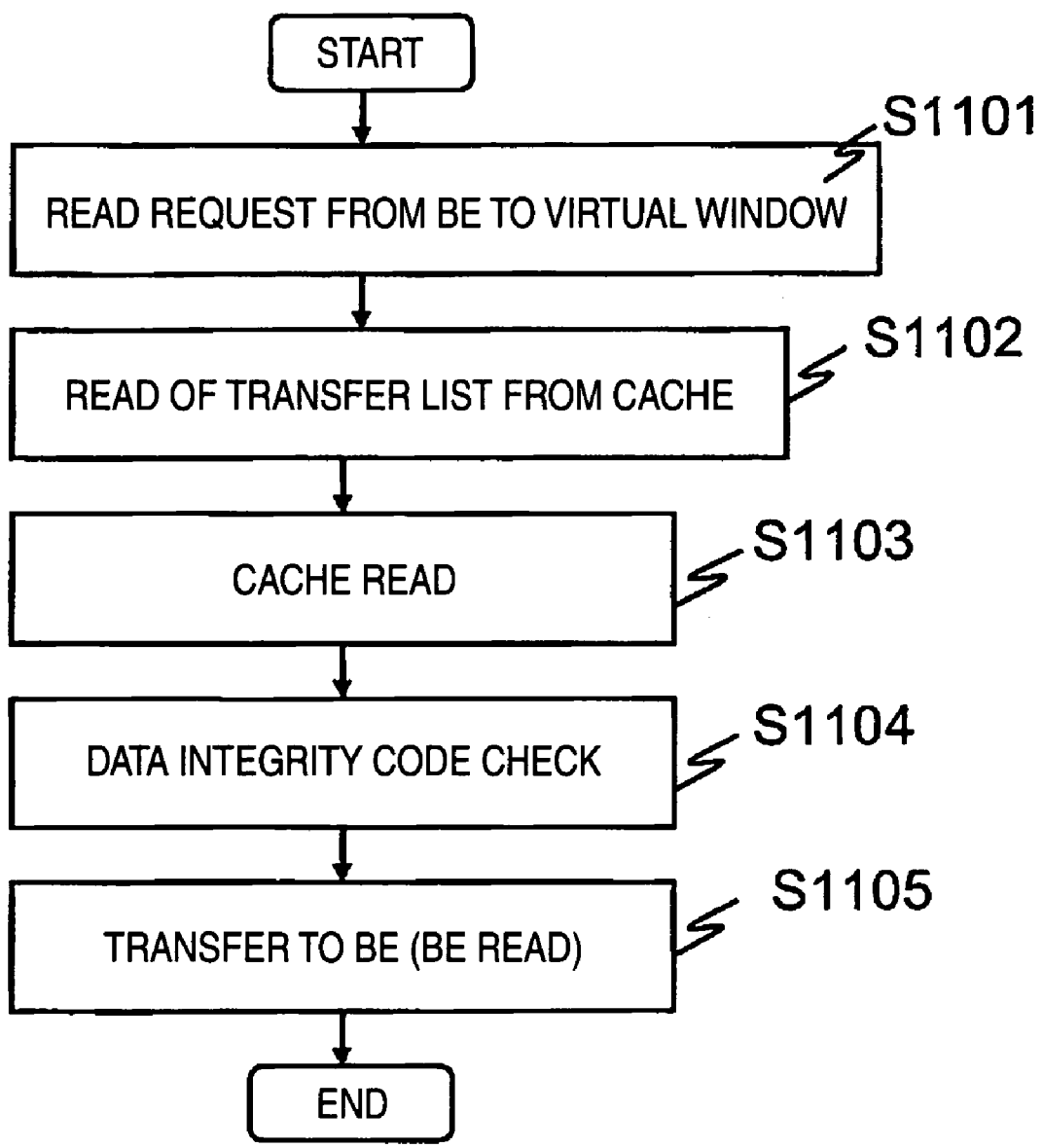
FIG. 11 is a flowchart diagram of the operation of the data transfer function from the cache to the BE of the storage control apparatus of the invention.

FIG. 11 is a flowchart of the operation of the data transfer function from the cache to the BE in the storage control apparatus of the invention. When the Central Processing Unit (CPU) 202 issues a control command of transfer to the back-end chip (BE) 206, the data transfer function is started to operate from the battery-backed-up cache memory 201 being a combination of a CS/DS and a cache to the back-end chip (BE) 206.

First of all, in step 1101, a read request is issued from the back-end chip (BE) 206 to the virtual window 208, and then in step 1102, the transfer list is read from the Cache 201. Then in step 1103, Cache reading is performed, and in step 1104, data integrity check is performed. In step 1105, the data through with the data integrity check is transferred to the back-end chip (BE) 206, i.e., BE read, and this is the end of the operation of the data transfer function from the cache to the BE.

Figure 12:
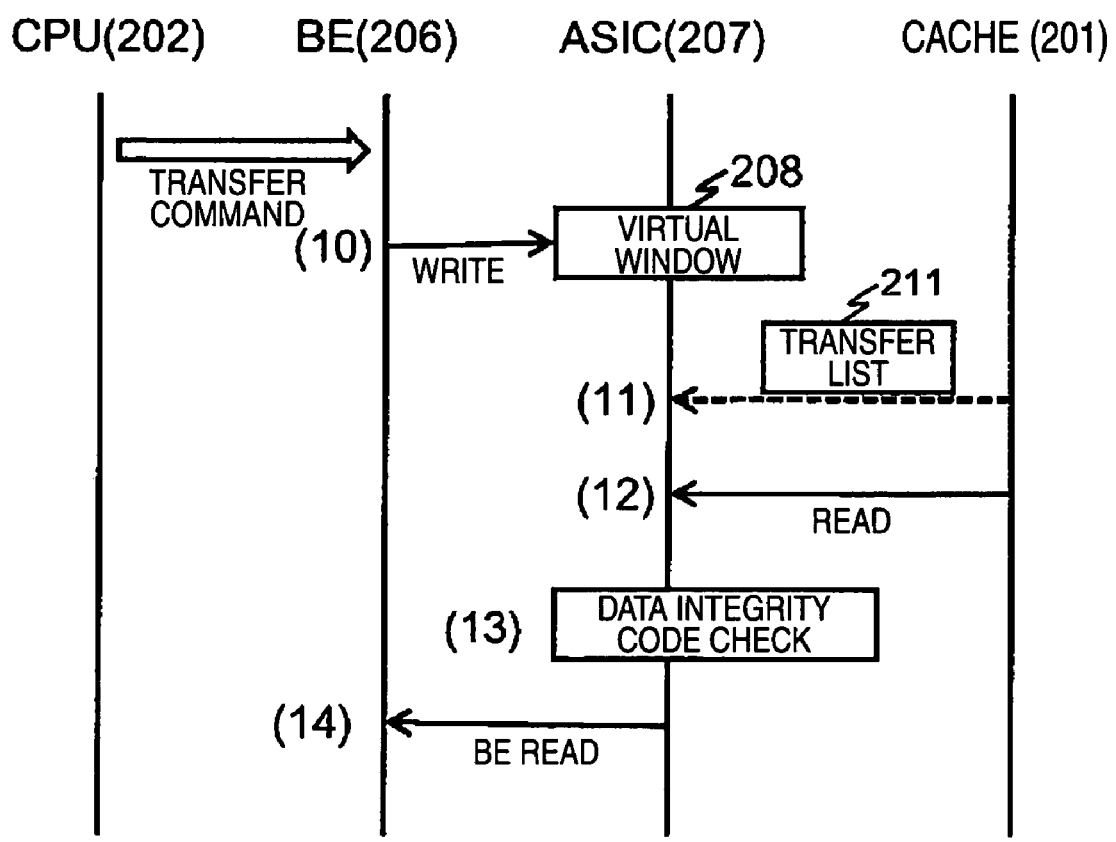
FIG. 12 is a sequence diagram of the operation of the data transfer function from the cache to the BE of the storage control apparatus of the invention.

FIG. 12 is a sequence diagram of the operation of the data transfer function from the cache to the BE in the storage control apparatus of the invention. An open arrow indicates a control command coming from the CPU or from the BE, a broken arrow indicates the flow of control data, and a solid arrow indicates the flow of user data.

In FIG. 12, when the Central Processing Unit (CPU) 202 issues a control command of transfer to the back-end chip (BE) 206, i.e., Cache to BE, a control command of read, i.e., read request, is issued from the back-end chip (BE) 206 to the virtual window 208 of the application-specific integrated circuit (ASIC) 207 (10). The application-specific integrated circuit (ASIC) 207 then reads the transfer list being the control data from the battery-backed-up cache memory 201 being a combination of a CS/DS and a cache (11), and then with reference to the transfer list, the application-specific integrated circuit (ASIC) 207 reads the user data from the battery-backed-up cache memory 201 being a combination of a CS/DS and a cache (12).

The application-specific integrated circuit (ASIC) 207 performs data integrity check to the user data being the read result (13), and the user data through with the data integrity check is transferred to the back-end chip (BE) 206, i.e., BE read, (14).

Front-End Dual Write Function

Figure 13:
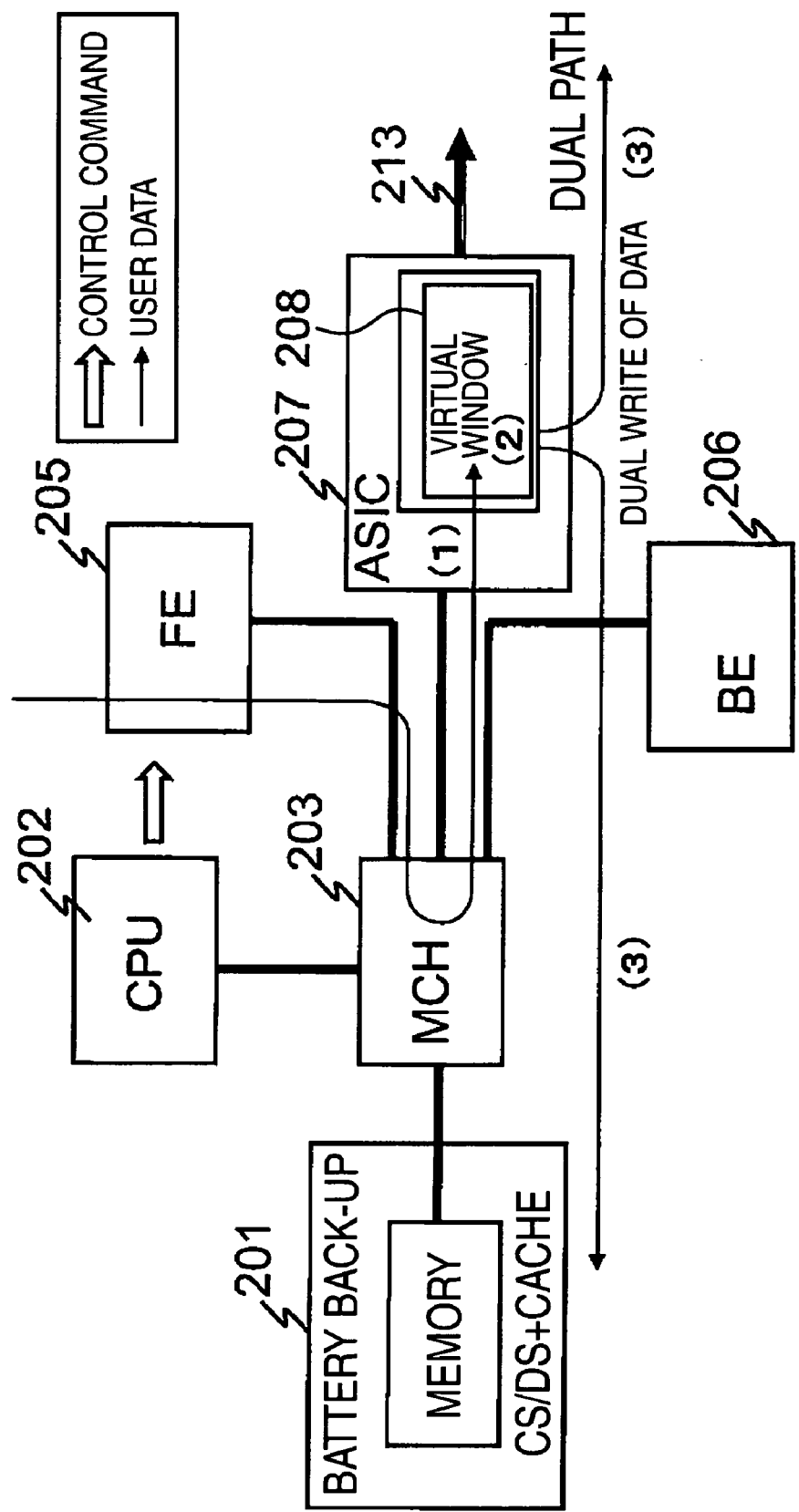
FIG. 13 is a configuration diagram showing the operation of a front-end dual write function in the storage control apparatus of the invention.

FIG. 13 is a configuration diagram showing the operation of a front-end dual write function in the storage control apparatus of the invention. An open arrow indicates a control command from the CPU, and a solid arrow indicates the flow of the user data. The bracketed numbers in the drawing are corresponding to those in the flowchart and the sequence diagram.

Figure 14:
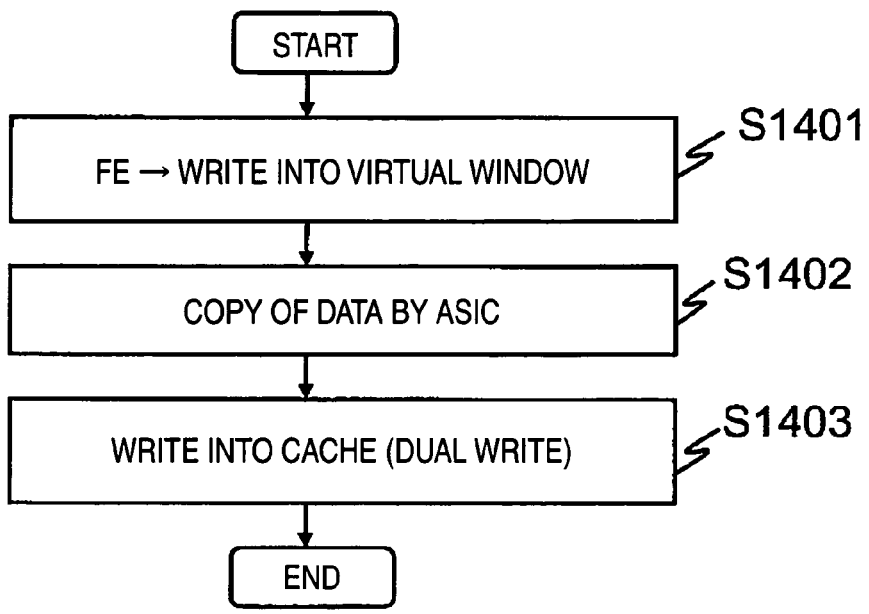
FIG. 14 is a flowchart of the operation of the front-end dual write function in the storage control apparatus of the invention.

FIG. 14 is a flowchart of the operation of the front-end dual write function of the storage control apparatus of the invention. When the Central Processing Unit (CPU) 202 issues a control command of transfer to the front-end chip (FE) 205, i.e., FE host write, the front-end dual write function is started to operate. First of all, in step 1401, writing is performed from the front-end chip (FE) 205 to the virtual window 208, and in step 1402, the application-specific integrated circuit (ASIC) 207 performs copying of data. Then in step 1403, dual write is performed to the Cache 201, and this is the end of the operation of the front-end dual write function.

Figure 15:
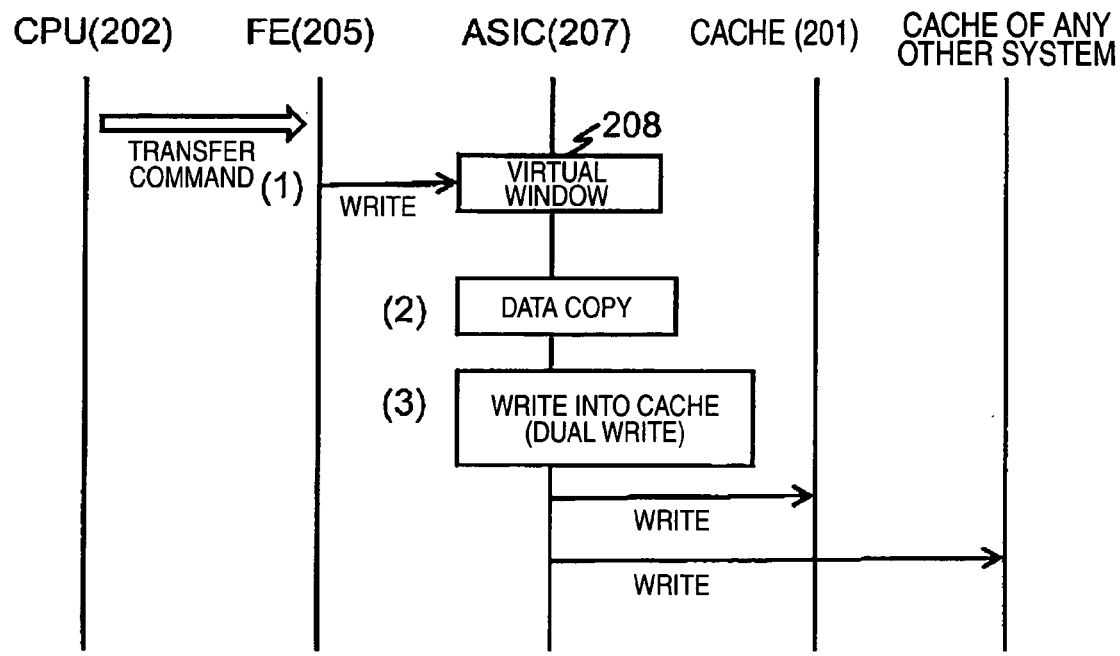
FIG. 15 is a sequence diagram showing the operation of the front-end dual write function in the storage control apparatus of the invention.

FIG. 15 is a sequence diagram showing the operation of the front-end dual write function in the storage control apparatus of the invention. An open arrow indicates a control command from the CPU, and a solid arrow indicates the flow of the user data. In FIG. 15, when the Central Processing Unit (CPU) 202 issues a control command of transfer to the front-end chip (FE) 205, i.e., FE host write, the front-end dual write function is started to operate. First of all, writing is performed from the front-end chip (FE) 205 to the virtual window 208 of the application-specific integrated circuit (ASIC) 207 (1), and the application-specific integrated circuit (ASIC) 207 performs copying of the written data (2). Then dual writing of data is performed to the battery-backed-up cache memory 201 being a combination of a CS/DS and a cache, and to a cache memory of any other system (not shown).

Back-End Writing

Figure 16:
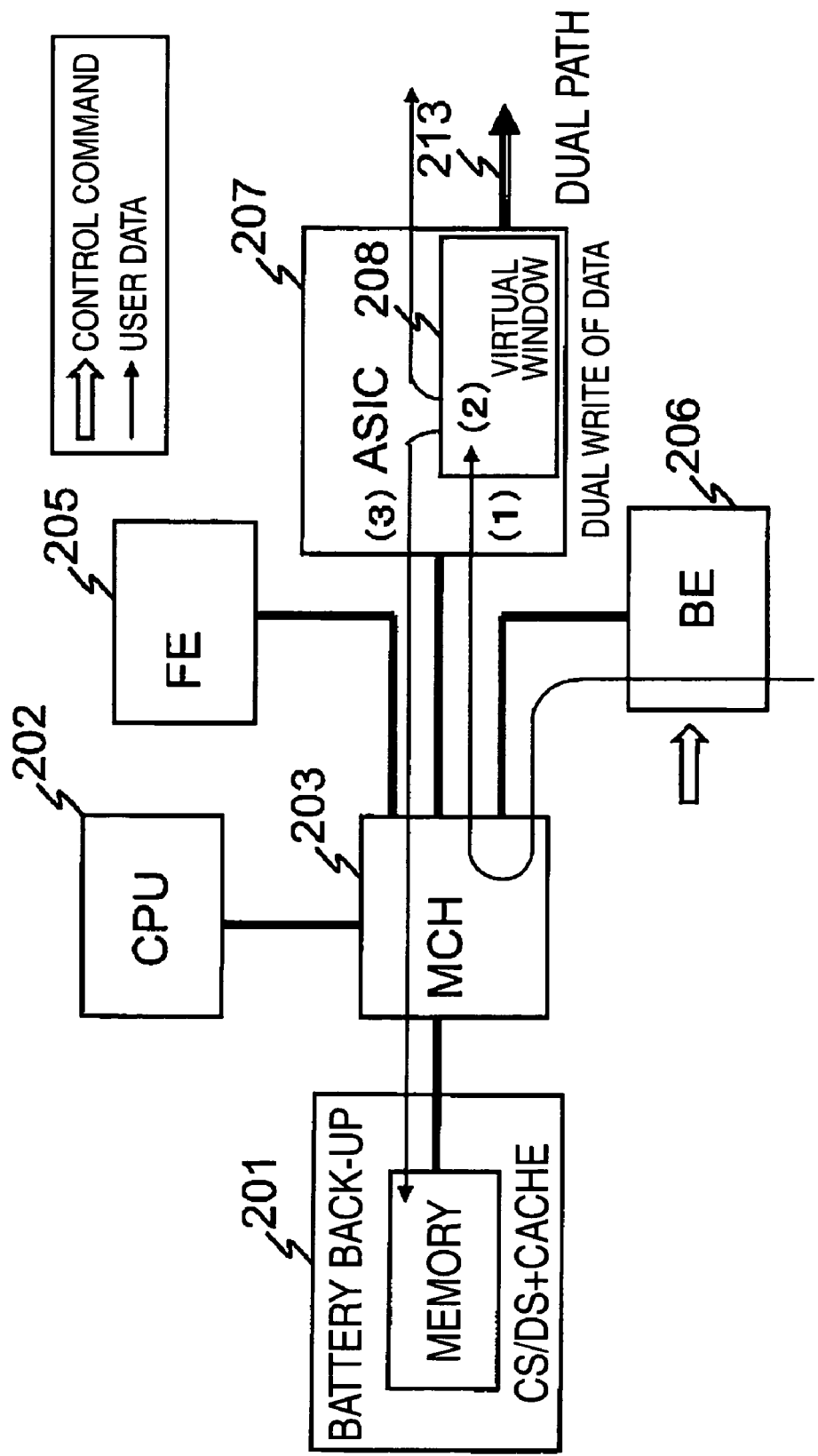
FIG. 16 is a configuration diagram showing the operation of a back-end write function in the storage control apparatus of the invention.

FIG. 16 is a configuration diagram showing the operation of a back-end write function in the storage control apparatus of the invention. An open arrow indicates a control command from the CPU, and a solid arrow indicates the flow of the user data. The bracketed numbers in the drawing are corresponding to those in the flowchart and the sequence diagram.

Figure 17:
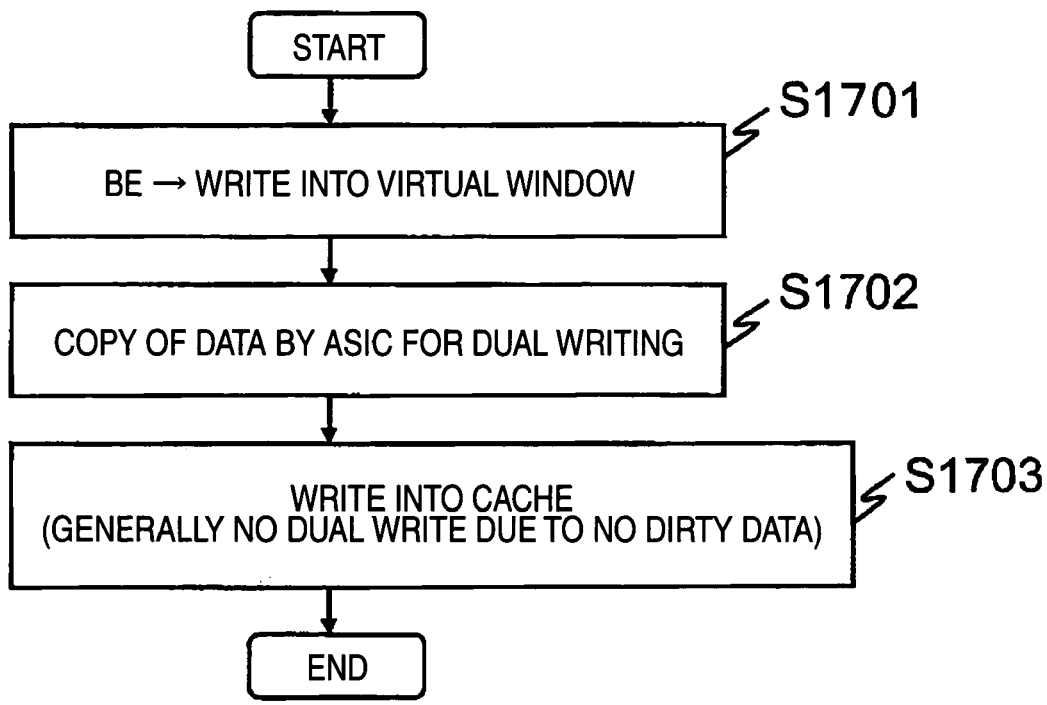
FIG. 17 is a flowchart of the operation of the back-end write function in the storage control apparatus of the invention.

FIG. 17 is a flowchart of the operation of the back-end write function in the storage control apparatus of the invention. When the Central Processing Unit (CPU) 202 issues a control command of transfer to the back-end chip (BE) 206, i.e., BE cache write, the back-end write function is started. First of all, in step 1701, writing is performed from the back-end chip (BE) 206 to the virtual window 208, and in step 1702, the application-specific integrated circuit (ASIC) 207 performs copying of data. Then in step 1703, writing is performed to the Cache 201. Because the data is not dirty data, dual write is not generally performed. After completion of writing to the Cache 201, the operation of the back-end write function is ended.

Figure 18:
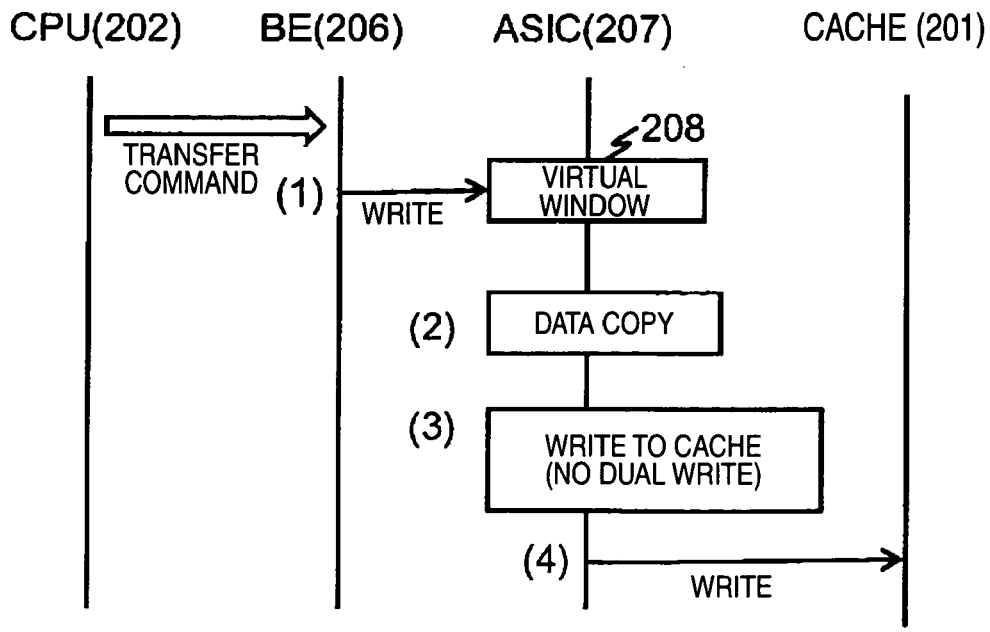
FIG. 18 is a sequence diagram showing the operation of the back-end write function in the storage control apparatus of the invention.
Figure 19:
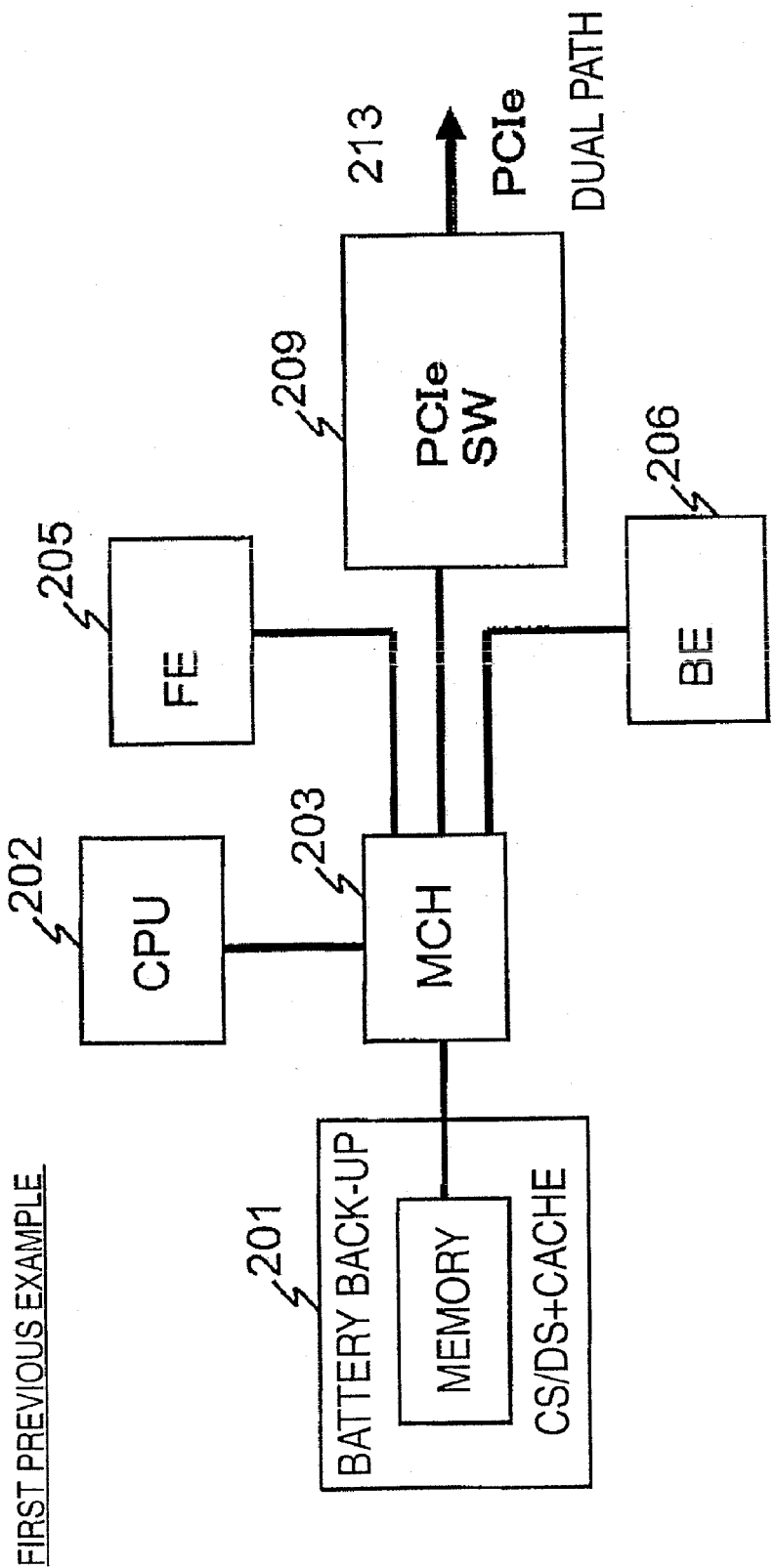
FIG. 19 is a diagram showing the configuration of a storage control apparatus of a first previous example.
Figure 20:
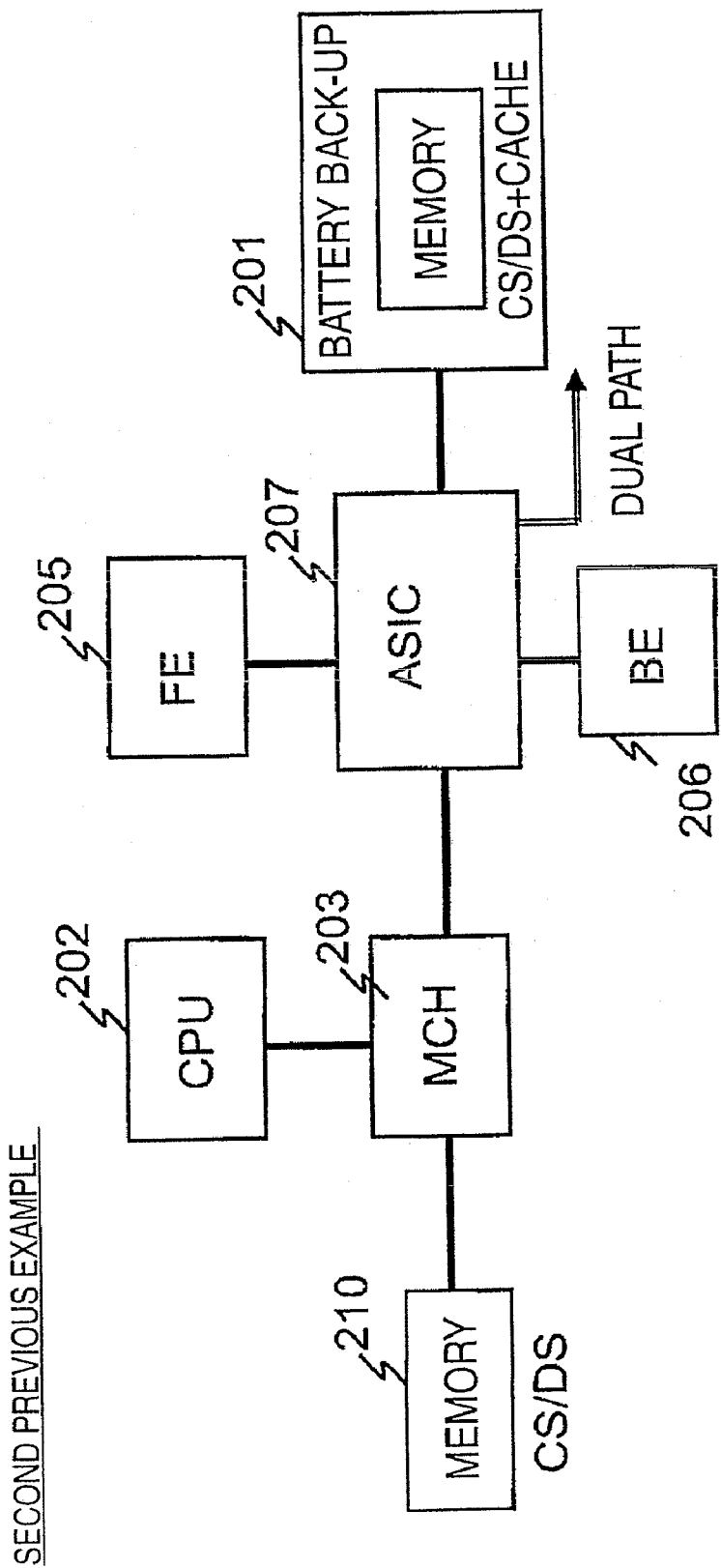
FIG. 20 is a diagram showing the configuration of a storage control apparatus of a second previous example.
Figure 21:
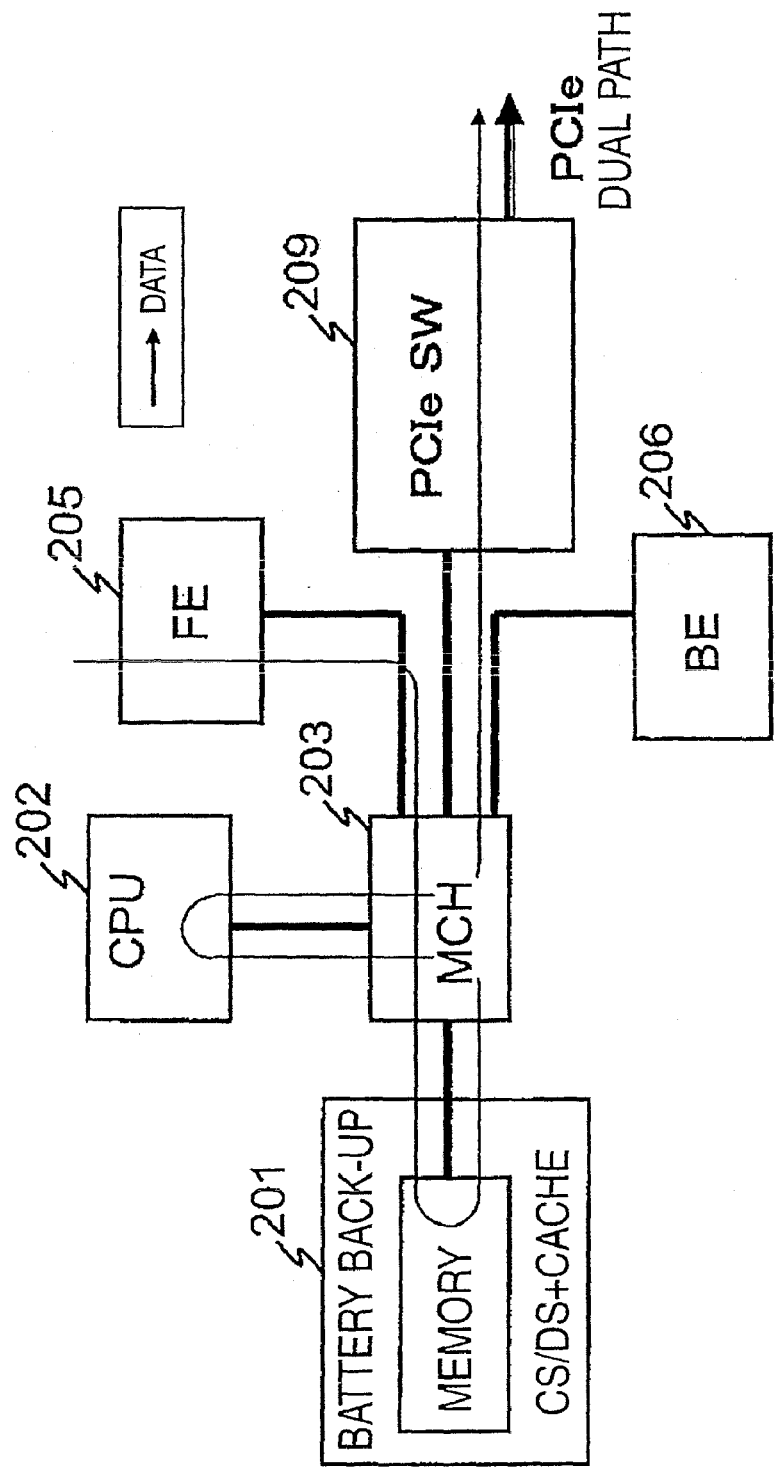
FIG. 21 is a configuration diagram showing the operation of data dual write of the storage control apparatus of the first previous example.

FIG. 18 is a sequence diagram showing the operation of the back-end write function in the storage control apparatus of the invention. An open arrow indicates a control command from the CPU, and a solid arrow indicates the flow of the user data. In FIG. 18, when the Central Processing Unit (CPU) 202 issues a control command of transfer to the back-end chip (BE) 205, i.e., BE cache write, the back-end write function is started. First of all, writing is performed from the back-end chip (BE) 206 to the virtual window 208 of the application-specific integrated circuit (ASIC) 207 (1), and the application-specific integrated circuit (ASIC) 207 then performs copying of the written data (2). Then writing of data is performed to the battery-backed-up cache memory 201 being a combination of a CS/DS and a cache. In this case, the data written into the application-specific integrated circuit (ASIC) 207 is located in a storage device (not shown) coupled to the back-end chip (BE) 206, and because this data is not dirty data, dual write of data is not performed to a cache memory or others of any other system.

The storage control apparatus and the storage system of the invention are both widely applicable to a memory device provided therein with a plurality of memories.

What is claimed is:

1. A storage control apparatus for coupling to one or more disk drives, comprising:
    a back-end section that couples together the one or more disk drives, and controls over the disk drive(s);
    a front-end section for coupling to a host computer;
    a central processing unit (CPU) for control over the storage control apparatus in its entirety;
    a memory for storing a program to be run by the CPU, and control information; and
    an application-specific integrated circuit provided with a virtual window which corresponds to a part of an address space of the CPU, wherein:
    the memory is configured for temporarily storing data for reading and writing from/to the one or more disk drives,
    when a data read/write request is issued by the front-end or back-end section with a destination of an address on the virtual window of the application-specific integrated circuit, the reading and writing of the data is performed from/to the memory via the application-specific integrated circuit,
    the application-specific integrated circuit is coupled to an other application-specific integrated circuit provided to an other storage control apparatus, and
    the application-specific integrated circuit:
    receives a data write request from the front-end or back-end section with the designation of the address on the virtual window, and
    has, based on a transfer list for use to specify the address on the memory and an address on an other memory provided to the other storage control apparatus corresponding to the address on the virtual window, a write-duplicating function for writing the data into the memory, and into the other memory provided to the other storage control apparatus via the application-specific integrated circuit provided thereto.

2. The storage control apparatus according to claim 1, wherein:
    the application-specific integrated circuit performs, when receiving the data read/write request from the front-end or back-end section with the designation of the address on the virtual window, the reading and writing of the data from/to the memory based on an address on the memory found in the transfer list read from the memory.

3. The storage control apparatus according to claim 2, wherein: the application-specific integrated circuit
    receives the data read/write request from the front-end or back-end section with the designation of the address on the virtual window, and
    is provided with a block data protection function for adding a data integrity code for error correction of the data for the reading and writing, deleting the added data integrity code, and inspecting any error of the data for the reading and writing using the data integrity code added thereto.

4. The storage control apparatus according to claim 2, wherein:
    the application-specific integrated circuit
    receives the data read/write request from the front-end or back-end section with the designation of the address on the virtual window of the application-specific integrated circuit, and
    performs the reading and writing of the data from/to the addresses on the memory in accordance with the transfer list read from the memory including a group of the addresses of the memory.

5. The storage control apparatus according to claim 2, further comprising:
    a battery backup device that provides, when a power supply from an outside is stopped, the power supply to the memory not to lose the contents of the memory.

6. The storage control apparatus according to claim 1, wherein:
    the application-specific integrated circuit
    receives the data read/write request from the front-end or back-end section with the designation of the address on the virtual window, and
    is provided with a block data protection function for adding a data integrity code for error correction of the data for the reading and writing, deleting the added data integrity code, and inspecting any error of the data for the reading and writing using the data integrity code added thereto.

7. The storage control apparatus according to claim 1, wherein:
    the application-specific integrated circuit
    receives the data read/write request from the front-end or back-end section with the designation of the address on the virtual window of the application-specific integrated circuit, and
    performs the reading and writing of the data from/to the addresses on the memory in accordance with the transfer list read from the memory including a group of the addresses of the memory.

8. The storage control apparatus according to claim 1, further comprising:
    a battery backup device that provides, when a power supply from an outside is stopped, the power supply to the memory not to lose the contents of the memory.

9. A storage control apparatus for coupling to one or more disk drives, comprising:
    a back-end section that couples together the one or more disk drives, and controls over the disk drive(s);
    a front-end section for coupling to a host computer;
    a central processing unit (CPU) for control over the storage control apparatus in its entirety;
    a memory for storing a program to be run by the CPU, and control information; and
    an application-specific integrated circuit provided with a virtual window which corresponds to a part of an address space of the CPU, wherein:
    the memory is configured for temporarily storing data for reading and writing from/to the one or more disk drives,
    when a data read/write request is issued by the front-end or back-end section with a destination of an address on the virtual window of the application-specific integrated circuit, the reading and writing of the data is performed from/to the memory via the application-specific integrated circuit,
    the application-specific integrated circuit
    receives the data read/write request from the front-end or back-end section with the designation of the address on the virtual window, and
    is provided with a block data protection function for adding a data integrity code for error correction of the data for the reading and writing, deleting the added data integrity code, and inspecting any error of the data for the reading and writing using the data integrity code added thereto.

10. A storage control apparatus for coupling to one or more disk drives, comprising:

- a back-end section that couples together the one or more disk drives, and controls over the disk drive(s);
- a front-end section for coupling to a host computer;
- a central processing unit (CPU) for control over the storage control apparatus in its entirety;
- a memory for storing a program to be run by the CPU, and control information; and
- an application-specific integrated circuit provided with a virtual window which corresponds to a part of an address space of the CPU, wherein:
- the memory is configured for temporarily storing data for reading and writing from/to the one or more disk drives,
- when a data read/write request is issued by the front-end or back-end section with a destination of an address on the virtual window of the application-specific integrated circuit, the reading and writing of the data is performed from/to the memory via the application-specific integrated circuit,
- the application-specific integrated circuit performs, when receiving the data read/write request from the front-end or back-end section with the designation of the address on the virtual window, the reading and writing of the data from/to the memory based on an address on the memory found in a transfer list read from the memory,
- the application-specific integrated circuit receives the data read/write request from the front-end or back-end section with the designation of the address on the virtual window, and is provided with a block data protection function for adding a data integrity code for error correction of the data for the reading and writing, deleting the added data integrity code, and inspecting any error of the data for the reading and writing using the data integrity code added thereto.

* * * * *